United States Patent [19]
Schroder

[11] 4,263,712
[45] Apr. 28, 1981

[54] BATTERY PLATE WRAPPING MACHINE AND METHOD

[75] Inventor: Carl Schroder, San Marcos, Calif.

[73] Assignee: Dale Products, Inc., Fremont, Ohio

[21] Appl. No.: 967,379

[22] Filed: Dec. 7, 1978

[51] Int. Cl.³ .............................................. B23P 21/00
[52] U.S. Cl. .................................... 29/623.2; 29/730;
53/228; 198/486; 198/653; 198/695; 271/268
[58] Field of Search ...................... 29/730, 731, 623.1,
29/623.2, 623.4; 53/228, 229, 466; 198/486,
653, 695; 271/268, 85

[56] References Cited

U.S. PATENT DOCUMENTS

| | | | |
|---|---|---|---|
| 2,624,106 | 1/1953 | Lund | 29/730 |
| 3,596,435 | 8/1971 | Graves et al. | 53/228 |
| 3,900,341 | 8/1975 | Shoichiro et al. | 29/623.2 |
| 4,026,000 | 5/1977 | Anderson | 29/730 |
| 4,080,727 | 3/1978 | Stolle et al. | 29/730 |
| 4,080,732 | 3/1978 | Eberle | 29/730 |

FOREIGN PATENT DOCUMENTS

| | | | |
|---|---|---|---|
| 2706676 | 7/1978 | Fed. Rep. of Germany | 53/550 |
| 865077 | 4/1961 | United Kingdom | 53/229 |

*Primary Examiner*—Daniel C. Crane
*Attorney, Agent, or Firm*—Wilson, Fraser, Barker & Clemens

[57] ABSTRACT

The invention relates to improvements in a machine and method for enclosing battery plates within a pouch or envelope of sheet separator material. In such machines a length of such sheet is positioned in spanning relationship to a folding aperture or slot and a plate injector shuttle is mounted for reciprocating movement into and out of the folding aperture so that when a battery plate is mounted on the injector shuttle the movement of the injector shuttle into the folding aperture effects the folding of the sheet about the leading edge of the injector shuttle and the battery plate mounted thereon. This invention provides two pairs of grasping tongs mounted in laterally spaced positions on an extractor shuttle which in turn is mounted for reciprocating movement along a path parallel to the injector shuttle and on the opposite side of the folding aperture. The gripping portions of the tongs swing inwardly under each side of the envelope plate emerging from the folding aperture but at the same time tongs are disposed laterally outward of a wrapped plate conveyor which has its conveying surface aligned with the path of the injector shuttle. This arrangement permits the continuous operation of the injector and extractor shuttles without any delay period because neither the wrapped plates nor the extractor tongs interfere with the reciprocating movement of the extractor shuttle and the gripping tongs.

7 Claims, 6 Drawing Figures

BATTERY PLATE WRAPPING MACHINE AND METHOD

BACKGROUND OF THE INVENTION

Machines have heretofore been developed and utilized for wrapping battery plates in a sheet of sealable separator material and then sealing the two opposed overlapping edges of the sheet material to form an enclosing pouch or envelope open at the top end of the battery plate. See for example the disclosures of U.S. Pat. No. 3,900,341 to Schoichiro, U.S. Pat. No. 4,080,732 to Eberle, and pending application Ser. No. 815,814 filed July 15, 1977 by Robert D. Simonton and assigned to the assignee of this invention.

These machines achieved a folding of the web or sheet of sealable separator material around the battery plate by suspending a sheet in front of a folding slot hand then passing the battery plate horizontally through the slot to effect the wrapping of the web around the battery plate. As the wrapped plate emerges from the slot, grasping members, similar to tongs, engage the leading edge of the sheet enfolded battery plate and hold the sheet in firm alignment with the plate as the wrapped plate continues along the horizontal path and the enfolding sheet is subjected to a sealing operation on the overlapping edges of the sealable separator material which projects laterally beyond the sides of the enfolded battery plate.

The speed of operation of such prior art machines is obviously a function of the speed of the reciprocating movements of the injector and extractor shuttle mechanisms, which movements are in timed relationship. The above mentioned prior art machines suffered a disadvantage in that the extractor shuttle had to be stopped for an instant in its remote position relative to the folding aperture in order to release the grasping tongs from the wrapped plate and permit the plate to drop out of the path of the grasping mechanism so that it could move toward the folding slot to begin another cycle of operation. Obviously, if this momentary hesitation in the movement of the extractor mechanism could be eliminated, the speed of the battery plate wrapping operation could be significantly increased.

OBJECTS OF THIS INVENTION

Accordingly, it is an object of this invention to provide an improved method and apparatus for enclosing battery plates within a pough or envelope formed from a sheet of sealable separator material.

Another object of this invention is to improve the operating speed of machines for enclosing battery plates within an envelope of sealable separable material while at the same time maintaining registry of the battery plate with the sheet of separable material during the formation of the sheet into an enclosing envelope.

A particular object of this invention is to provide an improved extraction mechanism for grasping the leading edge of a sheet wrapped battery plate as it emerges from a folding aperture and to maintain the enveloping sheet and the plate in accurate registry during the sealing of the overlapping side edges of the sheet and to deposit the wrapped plate on a conveyor without interrupting or delaying the reciprocating movement of the extractor shuttle.

Other objects and advantages of the invention will become apparent to those skilled in the art from the following detailed description, taken in conjunction with the annexed sheets of drawings.

DESCRIPTION OF PREFERRED EMBODIMENT OF THE INVENTION

Figure 1:
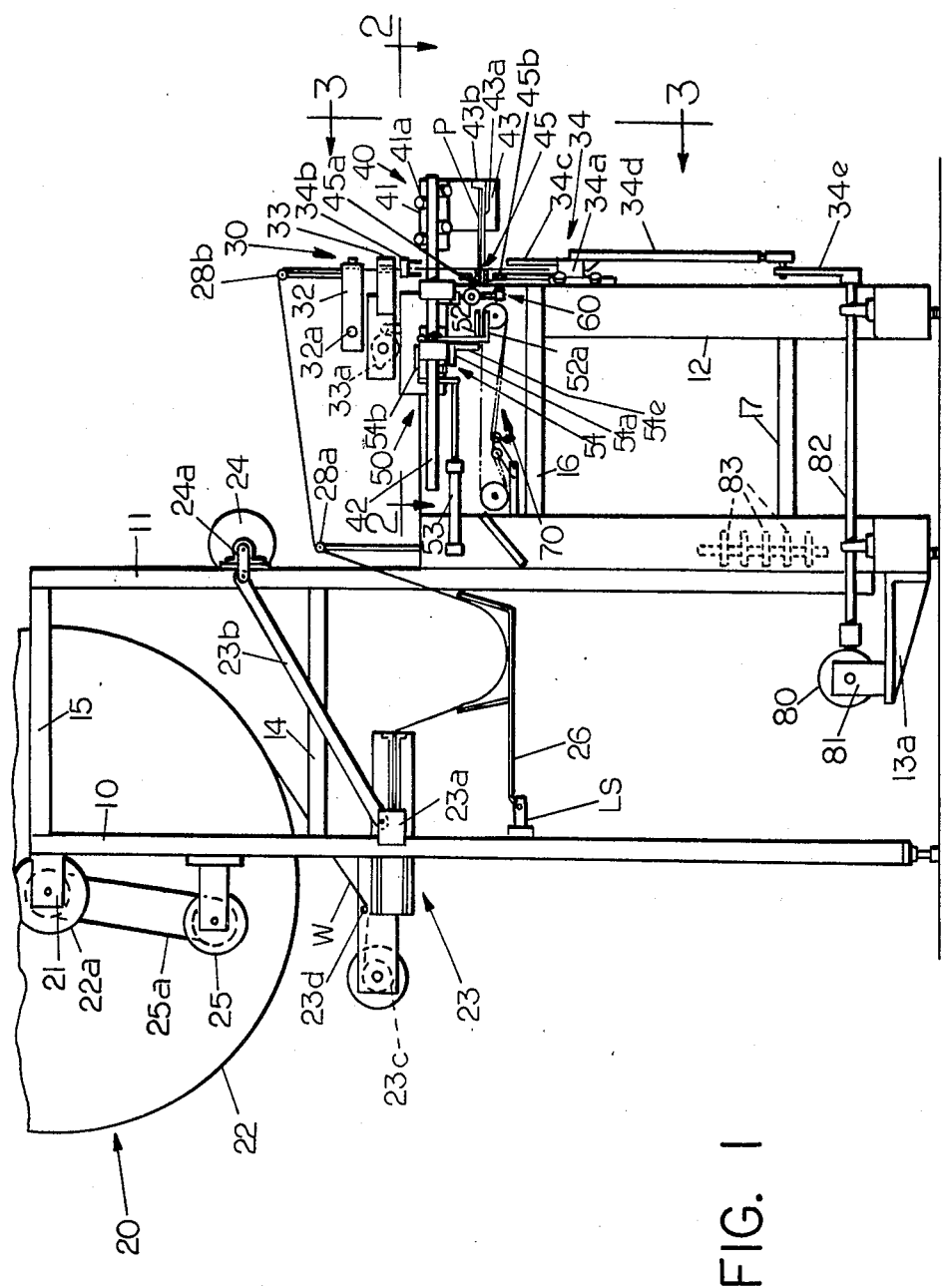
FIG. 1 is a front elevational schematic view of a battery plate wrapping machine incorporating this invention.

As schematically illustrated in the drawings, a machine 1 embodying the improvements of this invention comprises seven distinct mechanisms which are appropriately mounted on an articulated frame constructed by welding together of appropriate structural members; for example, there are two parallel upright angles 10, two upright angles 11, a pair of upright channels 12 and a pair of upright channels 13. At least one of each of the aforementioned frame elements are shown in the drawings. Horizontal members 14, 15, 16 and 17 connect the aforementioned upright frame elements to make a unitary structure. The frame structure of the machine forms no part of the instant invention and thus will not be described in any further detail.

On the aforementioned frame structure there are mounted the following mechanisms:

1. A web supply mechanism 20, including a roll stand 21 for receiving a roll 22 of plastic sheeting or web W from which the pouches enclosing the battery plates are formed.

2. A web feeding and cut-off mechanism 30 including two web end conveying mechanisms 32 and 34 and a cut-off knife 33 which operate to repeatedly sever predetermined lengths of web approximately twice the height of the battery plate to be wrapped.

3. A battery plate feeding mechanism 40 which pushes the leading edge of a battery plate tray adapted to receive plate P into transverse engagement with the central portion of a vertically disposed segment of web W which is to form the pough for that particular plate, and then pushes the leading edge of the battery plate tray with the battery plate thereon and the adjacent web into a horizontal slot 45 to effect the folding of the web about the battery plate.

4. A wrapped plate grasping mechanism 50 which engages the bottom edge of the battery plate P with the plastic web folded there around and pulls the assemblage through the web folding slot 45 while maintaining the alignment of the longitudinal sides of the web with respect to the lateral sides of the battery plate P.

5. A sealing mechanism 60 which simultaneously operates on both of the overlying lateral edges of the web immediately after they pass through the web folding slot and while the web is still held firmly in position relative to the battery plate by the grasping mechanism 50.

6. A wrapped plate conveyor 70 onto which the pouch enclosed battery plates WP are successively deposited. The conveying surface of conveyor 70 is aligned with and slightly below the folding aperture 45.

7. A prime mover 80 for the machine which, through appropriate gearing, belt and chain drives, either operates the various mechanisms heretofore described or through a series of cams 83 driven by the prime mover controls the various hydraulic cylinders to effect all of the operations in the desired sequence and thus accomplish the successive wrapping of battery plates placed on the plate feeder 40 within a pouch or envelope of thermoplastic separator material supplied from the roll 22.

PLASTIC WEB SUPPLY MECHANISM

Adjacent the top of the vertical frame members 10, there is provided a roll stand 21 for mounting the hub 22a of a continuous roll 22 of thermoplastic separator material. Successive lengths of plastic material web W are pulled off the roll 22 by a conventional reciprocating web pulling mechanism 23 which is mounted on the medial portion of the vertical frame members 10 and comprises a reciprocating clamp 23a which is driven by a lever connection 23b to a crank 24a rotated by a motor 24. This reciprocating feed mechanism is entirely conventional and is of the type that clamps the plastic web W during its motion toward the right, as viewed in FIG. 1, and then exerts no force on the web as it is reciprocated back to its extreme left hand position as shown in FIG. 1. Intermediate guide rollers 23c and 23d permit the web W to be withdrawn from the roll 22 in tangential fashion. To prevent the inertia of the relatively massive roll 22 from discharging an excessive amount of web material, an electrically controlled friction brake 25 is provided which is connected by a belt 25a and suitable pulleys to the hub 22a of the roll 22 and prevents the roll from turning except when a pulling force is applied to the web W by the feeding mechanism 23.

That portion of the web W which is pulled through the feeding mechanism 23 collects in the form of a depending loop and when the bottom of the loop engages a trough-shaped pivoted element 26, this element actuates a limit switch LS to stop the motor 24 driving the crank 24a. Thus, at all times, a loop of the web material W is always available for freely feeding into the machine 1.

Web material W then passes over guide rollers 28a and 28b and enters the machine by a vertically downwardly movement into the web feeding and cutoff mechanism 30.

WEB FEEDING AND CUTOFF MECHANISM

This mechanism comprises a first web feeder 32 of the reciprocating type, oscillating about a shaft 32a and incorporating appropriate conventional drive and web clamping mechanisms so that when the feeding mechanism 32 moves downwardly, the web is engaged and moved a short distance downwardly and into the shear mechanism 33. Again the details of shear mechanism 33 are entirely conventional and it is actuated in any suitable manner, such as by an eccentric 33a, to effect a severing of the web in timed relationship to other movements of other elements of the machine. The timing of the actuation of the web feeding mechanism 32 and the web shearing mechanism 33 will be hereinafter described in more detail.

Let us assume, however, that the shearing mechanism 33 has effected a cutting of the web W and at this point, the upper cut edge of the web is hidden within the shearing mechanism 33 and hence not conveniently available for engagement by a second web feeding mechanism 34 which comprises a block like member 34a slidably mounted for vertical movements on the lower portion of the vertical frame elements 12. The first web feeding mechanism 32 is actuated at this point to produce a short downwardly displacement of the cut edge of the web W below the shear mechanism 33 and in position to be engaged by a pair of laterally spaced web grippers 34b which project upwardly on rods 34c from slide block 34a. The slide block 34a, hence grippers 34b, are vertically reciprocated through a substantial stroke, in fact, a stroke equal to approximately twice the height of the battery plate to be wrapped, by a crank 34e and connecting arm 34d. Crank 34e is in turn driven from a main drive shaft 82 which is actuated by prime mover 80 through a gear reducing mechanism 81 appropriately mounted on a bracket 13a attached to the bottom end of the vertical frame elements 13. Grippers 34b are of conventional eccentric construction and are oscillated by their support rods 34c between a clamping position relative to an interposed web edge or a released position. A hydraulic cylinder (not shown) controlled in its operating sequence by a cam 83 effects such oscillation. Thus successive lengths of the plastic web W may be pulled downwardly from the shear mechanism 33 and positioned intermediate the battery plate loading mechanism 40 and a web folding transverse slot 45 defined between facing edges of horizontal plate members 45a and 45b appropriately mounted on the vertical frame elements 12.

The web W is severed to form the sheet to be folded around battery plate P to form the pouch or envelope containing the plate when the second web feeding mechanism 34 has drawn a web segment of the desired length beyond the cut-off location. This cut-off actuation is synchronized through mechanical linkages (not shown) from the common drive motor 80. At the end of the downstroke of rods 34c grippers 34b are released. The web segment or sheet is held essentially centered longitudinally on the transverse slot 45 defined by plates 45a and 45b by means of a spring biased pressure roller (not shown) bearing against the sheet and retaining it against a guide surface (not shown) above the plate 45a and in the vertical planar path of the sheet beneath the cut-off or shear 33. In this state the sheet is conditioned for prefolding by the advance of the leading edge 43c of the plate tray 43a.

After the sheet has begun to enter the slot 45 under the impetus of the plate tray 43a and has been drawn from between the pressure roller and guide surface, the first feeding mechanism 32 is oscillated by rotation of a cam (not shown) which can be on the shaft supporting the shear drive cam 33a, to advance a suitable length of the web W from beneath shear mechanism 33 to a suitable length for gripping by the grippers 34b. When the sheet and battery plate have been fully drawn into the slot 45 and the plate tray 43a has been retracted, the elevated and web engaged grippers 34b are moved downward. Elevation of grippers 34b can be accomplished while the sheet folding and plate advance functions of plate tray 43a occur, since the grippers 34b and their supporting rods 34c are outboard of the lateral sides of the sheet and clear of the path of travel of the plate P and tray 43a. The critical timing and sequencing of these elements in the above sequence is related to the motor drive 80 either through the control of cams 83 or by direct mechanical linkages by means not shown.

BATTERY PLATE FEEDING MECHANISM

Figure 2:
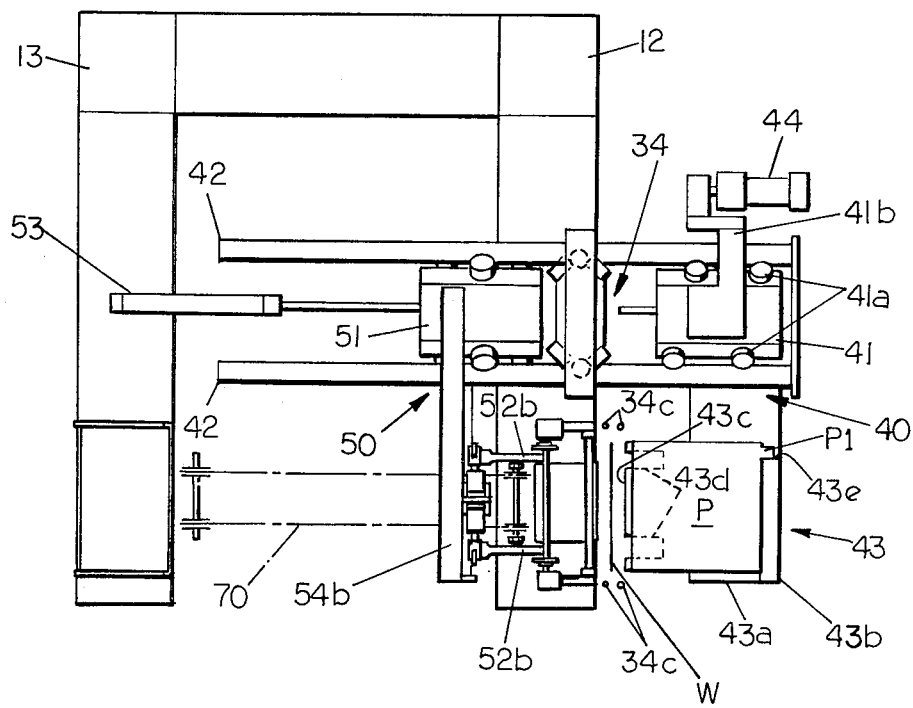
FIG. 2 is a plan view of a portion of FIG. 1, taken along the line 2—2 of FIG. 1.
Figure 3:
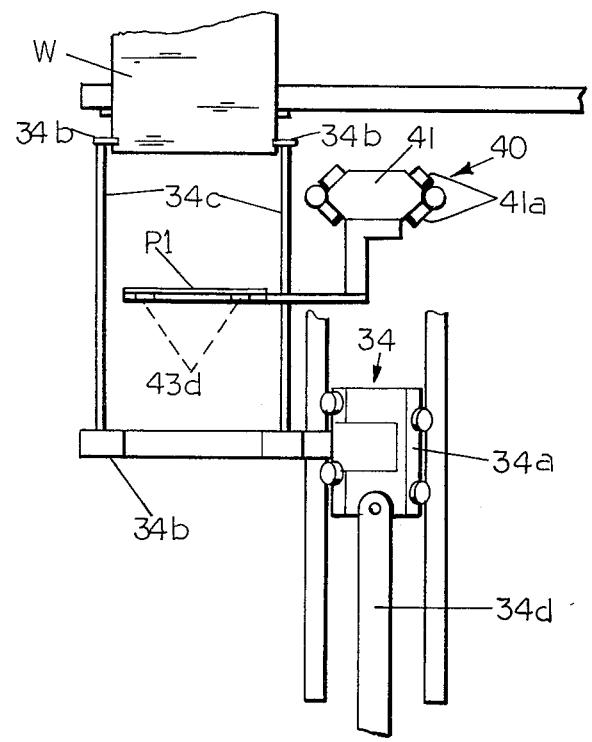
FIG. 3 is an end elevational view of a portion of FIG. 1, taken along the line 3—3 of FIG. 1.

Referring first to FIG. 2, the battery plate feeding mechanism 40 comprises a carriage 41 which reciprocates horizontally on a pair of cylindrical guide rails 42 which extend transversely across the machine a substantial distance and are suitably supported by the various vertical frame elements of the machine. The carriage 41 has a generally hexagonally shaped vertical cross section and a plurality of rollers 41a are mounted on each of the hexagonal surfaces that are disposed at a forty-five degree angle relative to the vertical. These rollers co-operate with the top and bottom portions of the adjacent guide rails 42 and thus permit free horizontal reciprocal motion of the carriage 41 without inducing any binds or misalignment in the direction of such motion.

A battery plate feeding frame 43 is secured by suitable bolts in depending relationship to the carriage 41. Frame 43 extends forwardly from carriage 41 and defines a horizontal battery plate supporting tray 43a in alignment with the slot 45 and transverse to the vertical path of plastic web W. Preferably tray 43a is slightly longer than a battery plate P so that the leading edge 43c of the tray will extend beyond the plate P when the top end of the plate P engages an integral shoulder 43b formed on the right end of tray 43a as viewed in FIGS. 1 and 2. Shoulder 43b is arranged with an end abuttment 43e against which the side of plate lug P1 is abutted. Leading edge 43c presents a true, square, fold defining edge to the web while accommodating any irregularities at the bottom edge of the plate P and causes the supported battery plate to move integrally with the supporting tray as it is moved toward the web folding aperture 45. Edge 45c has cutouts 43d to permit the grasping of the plate P and enveloping sheet portions of web W by tongs 52a, 52b without also grasping tray 43a and thus without interfering with the withdrawal of tray 43a while the tong ends retain the sheet-plate relationship.

The reciprocating motions of the plate feed carriage 41 are produced by a small cylinder 44 which is mounted on the frame behind the carriage 41 and engages an appropriate extension 41b on such carriage to produce the desired reciprocal movement of the carriage. Such movement is of course limited to bringing the leading edge 43c of the tray into engagement with the plastic web and pushing the web and the supported plate into the aperture 45 a distance sufficient for the plate grasping mechanism 50, that is disposed on the other side of the aperture 45, to grasp the web enfolded leading edge of the battery plate P. The operation of the plate grasping mechanism will be hereafter decribed but for the moment, it should be understood that the supported battery plate P and the web W are under positive control prior to and after the plate grasping mechanism engages the web enfolded leading edge of the battery plate P through cutouts 43d in plate tray 43a. At this point, the hydraulic cylinder 44 is reversely actuated to withdraw the support tray 43a from beneath the battery plate and to provide vertical clearance for the downward movement of the next segment of the plastic web W.

BATTERY PLATE GRASPING MECHANISM

The battery plate grasping mechanism 50 (FIGS. 4–6) also utilizes a hexagonally shaped carriage 51 on which are mounted a plurality of rollers 51a which co-operate with the left hand ends of the guide bars 42 as a traversing means for the grippers in a manner similar to that described in connection with the operation of the battery plate feeding carriage.

Two pair of battery plate gripping elements or tongs 52 are respectively mounted in spaced relationship on a shuttle frame 54 defined by a pair of parallel but off-set bars 54a and 54b having their one ends respectively secured to the top and bottom surfaces of the carriage 51 by suitable bolts and their outboard ends secured together by a vertical plate 54d and a longitudinally extending bar 51c. The shuttle frame elements 54a and 54b thus project transversely across and overlie the path of the wrapped plate conveyor 70.

The carriage 51, and hence the plate grippers 52 are reciprocated along the slide rods 42 by a hydraulic cylinder 53 which is disposed between the two guide rods 42 and has its operating rod directly connected to the end of the carriage 51.

Figure 5:
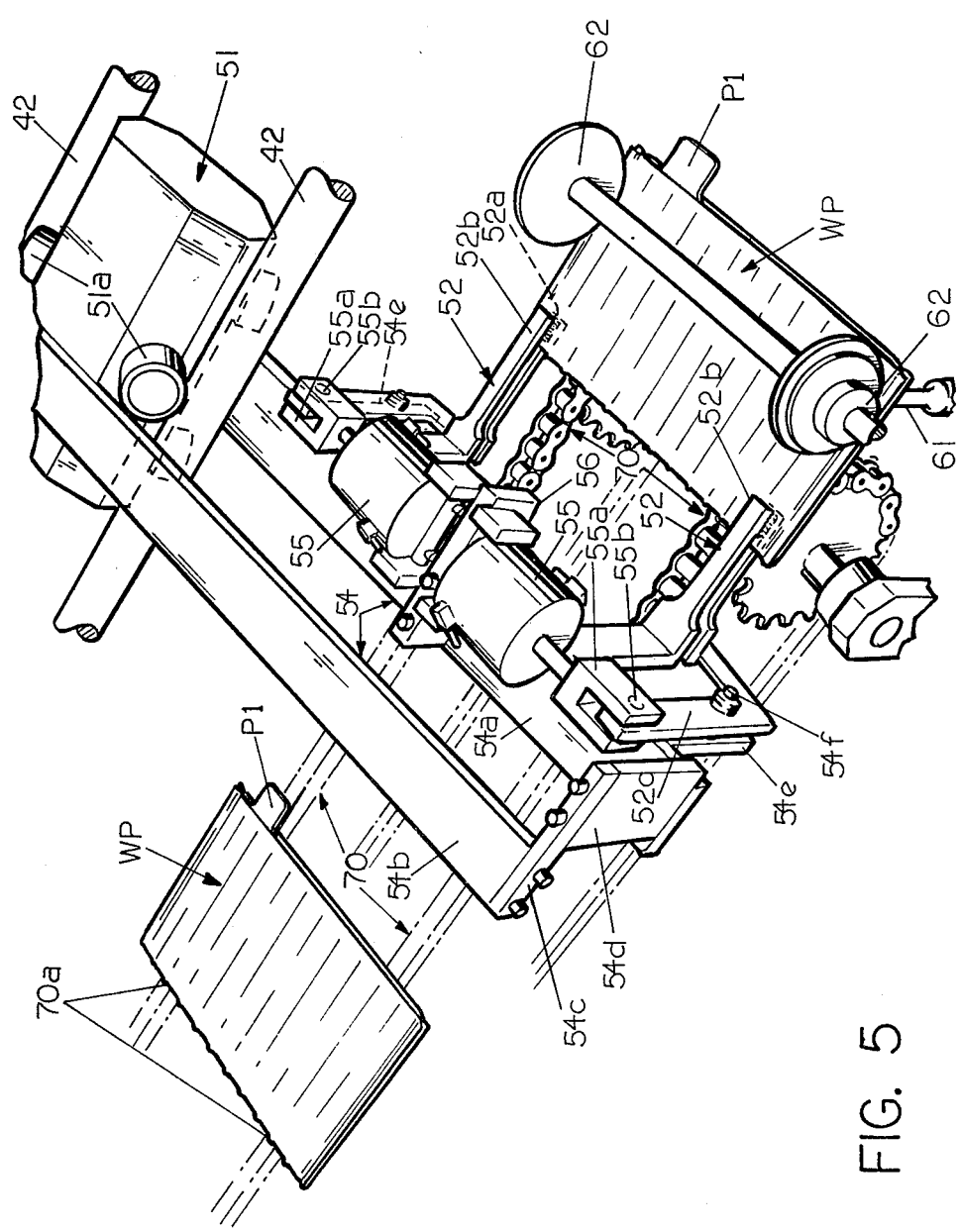
FIG. 5 is a view similar to FIG. 4 showing the gripping tongs in their closed position grasping a wrapped plate.
Figure 6:
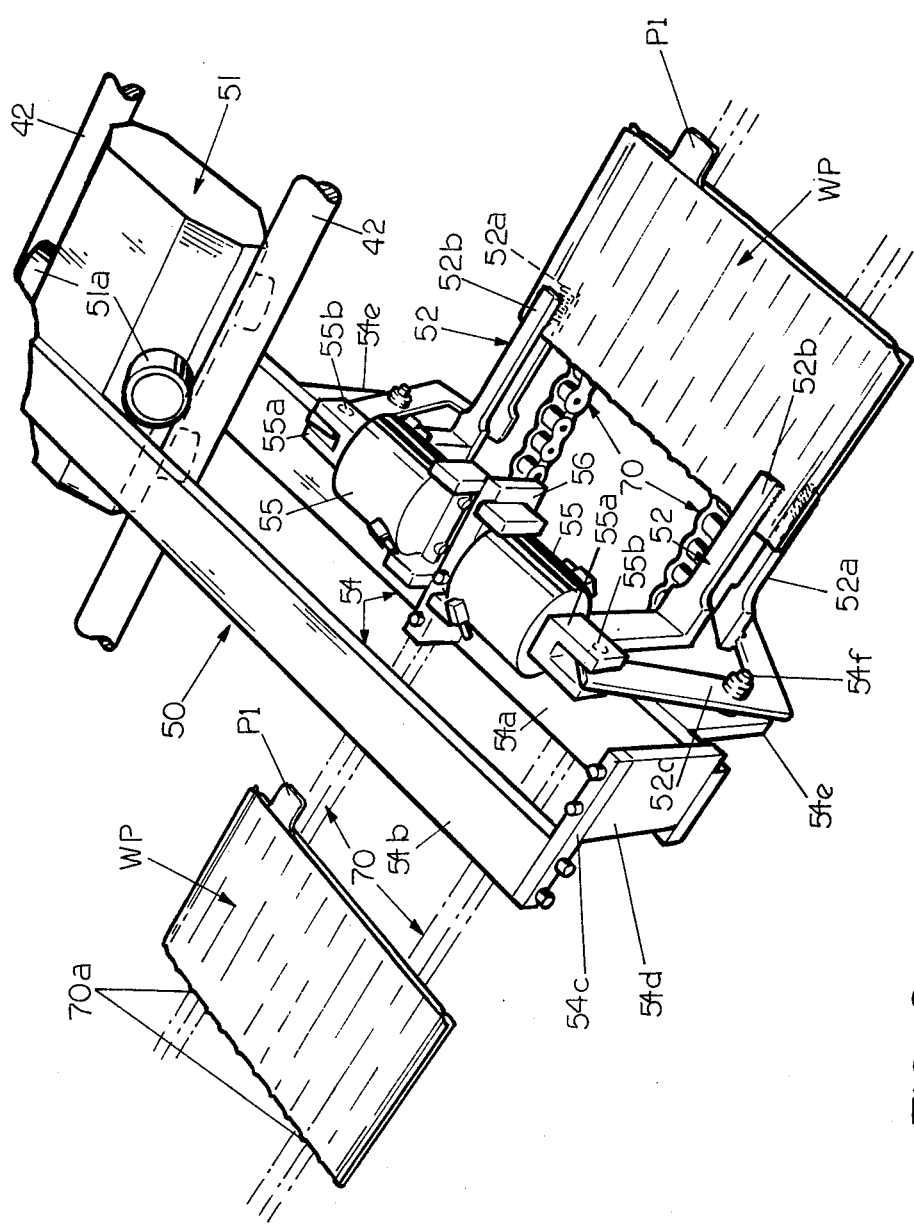
FIG. 6 is a view similar to FIG. 5 but showing the gripping tongs in their open position at the end of the outbound stroke.

Each gripping mechanism 52 includes a stationary upper gripping member 52b and a movable lower member 52a. A pair of pivot mounting brackets 54e are respectively secured in depending relationship to the bottom frame bar 54a on opposite sides of the path of the wrapped plate conveyor 70. In the lower end of each depending bracket 54e a horizontally disposed pivot pin 54f is suitably mounted and provides a pivotal mounting for the movable element 52a of the gripping mechanism 52. The stationary gripping member 52b is of L-shaped configuration and the top portion of such member is suitably secured in depending relationship to the frame bar 54a. The movable tong element 52a is secured to the end of an L-shaped mounting arm 52c which is medially mounted on the pivot pin 54f. Pivotal movements of the L-shaped member 52c about pivot mounting pin 54f will produce a lateral and upward displacement of the grasping portion of the movable tong 52a from an open position, as illustrated in FIG. 6, where it is completely out of the path of a wrapped plate WP supported on the conveyor 70, to a closed position, as shown in FIG. 5, wherein it is in a position grasping the leading portions of the sheet enfolded plate WP as it emerges from the folding notch or aperture 45. In this position, it will be noted that both grasping members 52 lie laterally inboard of the positions of the heat sealing mechanisms 60. The axis about which the tong element 52a is rotated extends parallel to the path of travel of the shuttle frame 54.

Each movable member 52a is actuated by a double acting fluid cylinder 55 which is suitably mounted in a frame structure 56 which is bolted to the bottom frame bar 51a. The output clevis 55a of each fluid cylinder 55 is connected to the top end of the L-shaped actuating link 52c by a suitable pivot pin 55b. The application of pressured fluid to the cylinders 55 is controlled by conventional valves (not shown) which are actuated in timed relationship to the position of the plate grasping shuttle 51 by one of the cams 83 driven by the prime mover 80. The timing sequence is such that as the wrapped plate extractor shuttle 51 moves to the right, as viewed in FIGS. 4 and 6, the tong like plate grasping mechanisms 52 are held in their open position by cylinders 55. The cylinders 55 are actuated to close the grasping tongs 52 when such tongs reach a position immediately adjacent the output side of the folding aperture 45, thus engaging the leading end of a sheet enfolded battery plate WP which is proceeding through such folding aperture. The grasping tongs 52 then remain in their closed position through the entire reverse stroke until just prior to reaching the extreme end of the reverse stroke, as illustrated in FIG. 6, at which point they are opened by cylinders 55 and the wrapped battery plate WP drops a very slight distance to rest on the top surface of the wrapped plate conveyor 70 and is moved to the left away from the folding notch 45. It is therefore apparent that all during the sealing operation, the enfolding separator sheet and the battery plate are rigidly clamped by the grasping tongs 52 to maintain the desired accurate alignment of the separator sheet relative to the enclosed battery plate.

It is thus apparent that the plate grasping and extracting mechanism 50 is effective to receive the sheet enfolded leading edge of the battery plate P and pull the plate and the surrounding separator sheet entirely through the folding aperture 45. While this action is occuring, the overlying lateral edges of the sheet are sealed together by an appropriate heat sealing mechanism 60.

HEAT SEALING MECHANISM

It should be understood that any of a number of well known forms of heat sealing mechanisms can be employed in the battery plate wrapping machine incorporating the improvements of this invention. There is shown in the drawing a conventional form of heat sealing mechanism comprising a pair of opposed ultrasonic generators 61 which are disposed below the lateral edges of the path of the folded sheet of separator material after it emerges from the folding apertures 45. The top surface of the overlapped edges of separator sheet are engaged by a freely rotating roller anvil 62 and the sealing is effected by the heat generated in the thermoplastic separator material by the ultrasonic energy projected by the generators 61. If desired, the heat seals could be effected by a plurality of opposed heated rollers, or by a pair of laser beam generators, but in every case, the sealing mechanism is positioned on the machine to direct its energy into the overlying edges of the folded separator sheet at a position outboard of the enclosed battery plate P and also outboard of the grasping tongs 52.

WRAPPED PLATE CONVEYING MECHANISM

Figure 4:
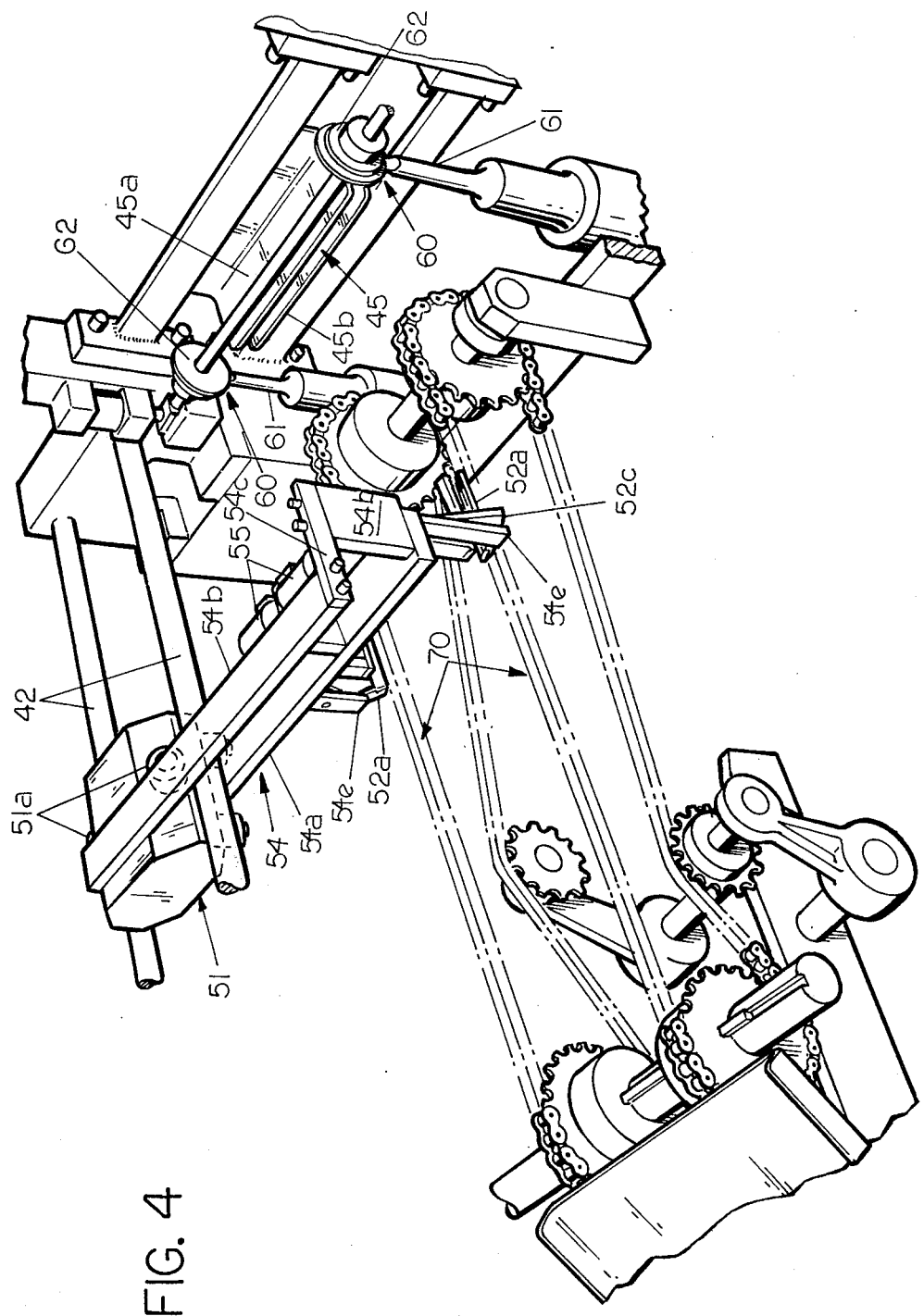
FIG. 4 is an enlarged scale perspective view of the wrapped plate extractor mechanism.

The conveying mechanism 70 may comprise either a pair of chains, as illustrated in the drawing, or a pair of belts or a solid belt. In any event, the top conveying surface 70a of the conveying mechanism is disposed in horizontal alignment with the folding aperture 45 and runs parallel to the movement of the plate gripping and extracting mechanism 50, but is disposed slightly below the wrapped plate WP while it is gripped by the tongs 52. As the plate gripping and extractor mechanism 50 moves to its extreme end position as shown in FIGS. 4 and 5, the gripping tongs 52 are opened by the downward and laterally outward swinging movement of the movable arm 52a of each such tong mechanism, thus depositing a wrapped plate WP on the conveying surface 70a of the underlying conveyor 70. Conveyor 70 may be moved either continuously or intermittently, the only requirement being that sufficient motion occur during the next in and out cycle of the gripping and extractor mechanism 50 so that the previous wrapped plate WP is moved to the left out of the way of the next wrapped plate. Most important is the fact that conveyor 70 lies between the grasping tongs 52. Conveying mechanism 70 is preferably driven by a direct connection to the prime mover 80, and therefore, operates in timed relationship to both the injector shuttle 40 and the plate extractor mechanism 50.

PRIME MOVER AND TIMING MECHANISM

The function of the prime mover 80 in driving the main control shaft 82 and web feed 34 has already been described. Additionally, through appropriate shaft and gearing, belt or chain drives, the prime mover 80 is utilized to operate the web cut-off mechanism 33 and the web feed 32. More importantly, prime mover 80 is mechanically connected to a vertical stack of cams 83 (FIG. 1) which in turn operate appropriate valves to control the operation of all of the fluid cylinders employed in the described machine. As mentioned, the prime mover 80 also operates the wrap plate conveyor 70. Hence the timing of the machine is automatically accomplished.

If the machine is to be automatically supplied with battery plates to be wrapped, then it is necessary to provide an interconnecting control to initiate the required sequence of operation upon the deposit of a new battery plate on the plate conveyor mechanism 40. Most importantly, the reciprocating movements of the plate feed injector shuttle 40 and the wrapped plate extracting and gripping mechanism 50 may be continuous in nature and not subject to any delays or hesitation in order for the wrapped plate to clear the path of the grasping tongs 52 before the plate grasping and extractor shuttle mechanism 50 may be moved toward the folding aperture 45 to pick up the next plate. In practice, it was found that the novel configuration of grasping tongs 52 has achieved a speed increase on the order of thirty to fifty percent over mechines not equipped with this type of grasping tongs.

Modifications of this invention will be apparent to those skilled in the art and it is intended that the preceding description be read as illustrative of the invention and not in a limiting sense.

I claim:

1. In an apparatus for enclosing storage battery plates in an envelope of sealable separator material including a folding aperture, means for positioning a sheet of separator material in spanning relationship to the folding aperture, a plate injector shuttle mounted for reciprocating movement into and out of said folding aperture so that movement of the injector shuttle into said folding aperture effects the folding of the sheet about the leading edge of the injector shuttle and a plate mounted thereon, the improvement comprising:

(1) an extractor shuttle frame mounted for reciprocating movements along a path parallel to said injector shuttle and on the opposite side of said folding aperture;

(2) two pairs of grasping tong mechanisms respectively mounted on said extractor shuttle frame at laterally spaced positions, each pair of tong mechanisms having a gripping arm pivoted about an axis extending parallel to the path of travel of said extractor shuttle frame from an open position spaced from the path of a wrapped plate to a closed gripping position located inwardly adjacent the lateral edge of the sheet enfolding the plate;

(3) means for maintaining the tongs in the open position as said extractor shuttle moves toward the folding aperture and in a closed gripping position as said extractor shuttle moves away from the folding aperture, and (4) a wrapped plate conveyor having its conveying surface aligned with the path of said injector shuttle and disposed entirely between said tongs, whereby an envelope enclosed plate is deposited on said conveyor after it passes through said folding aperture without interrupting the reciprocating movements of said extractor shuttle.

2. The improvements defined in claim 1 plus a pair of heat sealing mechanisms located on the same side of the folding aperture as said extractor shuttle frame and being respectively disposed at laterally spaced positions to engage and seal the two overlapping edges of the folded sealable material as it is moved away from the folding aperture by the grasping tongs, the gripping portions of said tongs lying between said heat sealing mechanisms in their closed positions, thereby gripping the folded sheet and the enclosed battery plate to prevent shifting of the plate relative to the enfolding separator material during passage through said sealing mechanisms.

3. The improvements defined in claims 1 or 2 wherein each of said grasping tong mechanisms includes a stationary gripping arm mounted in depending relationship to said extractor shuttle frame and in overlying relationship to the top surface of a sheet enfolded battery plate emerging from said folding aperture and cooperating with said movable gripping arm to grasp the sheet enfolded leading edge of the battery plate.

4. The improvements defined in claim 1 or 2 wherein said plate injector shuttle includes a tray constructed and arranged to support a battery plate thereon in alignment with the central portions of the folding aperture, said tray having a pair of apertures in its edge that enters the folding aperture, said apertures being laterally spaced and respectively alignable with the plate gripping portions of said grasping tongs.

5. The improvements defined in claim 1 wherein said means for maintaining the tongs in an open or closed position comprises a hydraulically actuated cylinder, and timing means for co-ordinating the operations of such cylinder with the position of said extractor frame means.

6. The method of wrapping a battery plate in an envelope formed from a sheet of sealable separator material comprising the steps of:

(1) positioning a sheet of sealable separator material in a vertical position with its longitudinal center portion aligned with a horizontal folding slot of limited depth;

(2) moving a battery plate horizontally into the folding slot with its bottom edge leading by a reciprocating injector shuttle to fold the sheet about the battery plate as it moves through the slot;

(3) grasping the sheet enfolded leading edge of the battery plate as it emerges from the folding slot with a pair of laterally spaced tong like mechanisms movable along a horizontal path and capable of maintaining the relative positions of the battery plate and the enfolding sheet by pivoting a gripping arm of each of said mechanisms about an axis extending parallel to the path of travel of said mechanisms and into engagement with the sheet, said grasping operation being performed at one end of said path;

(4) moving said tong like mechanisms along said horizontal path to an other end of said path;

(5) opening the tong like grasping mechanisms at the other end of their horizontal movement to release the sheet enfolded plate onto a horizontal conveyor moving between said grasping mechanisms; and (6) continuously reciprocating said injector shuttle and said grasping mechanisms in timed relationship to maximize the speed of the plate wrapping operation.

7. The method defined in claim 6 plus the step of heat sealing the overlapping edge portions of said sheet while the sheet enfolded plate is being moved by the grasping tong mechanisms, the seal lines being located laterally outwardly of the plate gripping positions of the grasping tong mechanisms.

* * * * *

UNITED STATES PATENT AND TRADEMARK OFFICE
CERTIFICATE OF CORRECTION

PATENT NO. : 4,263,712
DATED : April 28, 1981
INVENTOR(S) : CARL SCHRODER

It is certified that error appears in the above-identified patent and that said Letters Patent are hereby corrected as shown below:

Column 1, line 50 - "pough" should be - - pouch - - .

Column 2, line 53 - "pough" should be - - pouch - - .

Column 5, line 39 - "45c" should be - - 43c - - .

Column 7, line 36 - "apertures" should be - - aperture - - .

Column 8, line 13 - "shaft" should be - - shafts - - .

Column 8, line 39 - "mechines" should be - - machines - - .

Signed and Sealed this

Fourth Day of August 1981

[SEAL]

Attest:

GERALD J. MOSSINGHOFF

Attesting Officer    Commissioner of Patents and Trademarks